United States Patent
Reilaender

(10) Patent No.: US 11,441,708 B2
(45) Date of Patent: Sep. 13, 2022

(54) NUT AND LINE CONNECTION

(71) Applicant: Bayerische Motoren Werke Aktiengesellschaft, Munich (DE)

(72) Inventor: Udo Reilaender, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 142 days.

(21) Appl. No.: 16/806,473

(22) Filed: Mar. 2, 2020

(65) Prior Publication Data

US 2020/0200305 A1  Jun. 25, 2020

Related U.S. Application Data

(63) Continuation of application No. PCT/EP2018/075560, filed on Sep. 21, 2018.

(30) Foreign Application Priority Data

Oct. 27, 2017 (DE) ...................... 10 2017 219 320.4

(51) Int. Cl.
| | |
|---|---|
| *F16L 19/025* | (2006.01) |
| *F16B 39/286* | (2006.01) |
| *F02M 55/00* | (2006.01) |
| *F02M 59/48* | (2006.01) |
| *F16B 39/28* | (2006.01) |
| *F16B 39/38* | (2006.01) |

(52) U.S. Cl.
CPC ......... *F16L 19/025* (2013.01); *F02M 55/004* (2013.01); *F02M 59/48* (2013.01); *F16B 39/28* (2013.01); *F16B 39/286* (2013.01); *F16B 39/38* (2013.01); *F02M 2200/26* (2013.01); *F02M 2200/8076* (2013.01)

(58) Field of Classification Search
CPC .... F16B 39/282; F16B 39/284; F16B 39/286; F02M 55/005; F02M 55/02; F02M 55/025

See application file for complete search history.

(56) References Cited

U.S. PATENT DOCUMENTS

| 168,597 A | 10/1875 | Atwood |
| 1,957,042 A * | 5/1934 | Grant .................... F16B 39/286 411/276 |
| 2,243,515 A * | 5/1941 | Van Sant .............. F16B 39/286 411/291 |
| 2,289,309 A | 7/1942 | Winkle |

(Continued)

FOREIGN PATENT DOCUMENTS

| CH | 86759 A * | 10/1920 | ............ F16B 39/286 |
| CH | 397 341 A | 8/1965 | |

(Continued)

OTHER PUBLICATIONS

CH-86759-A English machine translation of Description provided by ESPACENET (Year: 2021).*

(Continued)

*Primary Examiner* — Michael A Kessler
(74) *Attorney, Agent, or Firm* — Crowell & Moring LLP

(57) ABSTRACT

A nut, in particular a union nut for a line connection, extends along a longitudinal direction, wherein the nut has at least one expansion region. The expansion region has circumferentially one or more recesses which extend transversely and/or obliquely to the longitudinal direction.

4 Claims, 1 Drawing Sheet

(56) References Cited

U.S. PATENT DOCUMENTS

| | | | | |
|---|---|---|---|---|
| 2,304,310 | A | * | 12/1942 | Luce .................... F16B 39/286 |
| | | | | 411/291 |
| 2,830,486 | A | * | 4/1958 | Dillon ................... F16B 31/028 |
| | | | | 411/9 |
| 6,431,608 | B1 | * | 8/2002 | Kato .................... F02M 55/002 |
| | | | | 285/13 |
| 2016/0169424 | A1 | | 6/2016 | Boettcher et al. |
| 2018/0038525 | A1 | | 2/2018 | Kwast et al. |

FOREIGN PATENT DOCUMENTS

| | | | |
|---|---|---|---|
| CN | 101672318 A | 3/2010 | |
| CN | 204878245 U | 12/2015 | |
| CN | 204921633 U | 12/2015 | |
| CN | 105393042 A | 3/2016 | |
| CN | 107110088 A | 8/2017 | |
| DE | 16 52 058 U | 3/1953 | |
| DE | 10 2015 102 877 A1 | 9/2016 | |
| EP | 1760305 A1 * | 3/2007 | ......... F02M 51/0603 |
| EP | 2 986 882 B1 | 5/2017 | |
| FR | 1179722 A * | 5/1959 | ............ F16B 39/286 |
| GB | 738374 A * | 10/1955 | ............ F16B 39/286 |
| WO | WO-03038293 A1 * | 5/2003 | ............. F16B 37/02 |
| WO | WO 2015/007483 A1 | 1/2015 | |

OTHER PUBLICATIONS

International Search Report (PCT/ISA/210) issued in PCT Application No. PCT/EP2018/075560 dated Dec. 11, 2018 with English translation (five (5) pages).

German-language Written Opinion (PCT/ISA/237) issued in PCT Application No. PCT/EP2018/075560 dated Dec. 11, 2018 (six (6) pages).

German-language Search Report issued in German Application No. 10 2017 219 320.4 dated Aug. 16, 2018 with partial English translation (10 pages).

English translation of Office Action issued in Chinese Application No. 201880059007.7 dated Jun. 29, 2021 (9 pages).

English translation of Chinese Office Action issued in Chinese Application No. 201880059007.7 dated Jan. 5, 2021 with (10 pages).

\* cited by examiner

NUT AND LINE CONNECTION

CROSS REFERENCE TO RELATED APPLICATIONS

This application is a continuation of PCT International Application No. PCT/EP2018/075560, filed Sep. 21, 2018, which claims priority under 35 U.S.C. § 119 from German Patent Application No. 10 2017 219 320.4, filed Oct. 27, 2017, the entire disclosures of which are herein expressly incorporated by reference.

BACKGROUND AND SUMMARY OF THE INVENTION

The present invention relates to a (screw) nut, in particular a union nut for a line connection, such as a tapered or ball connection, to a line connection, and to the use of a nut.

In the case of ball or tapered screw connections, such as are used, inter alia, in motor vehicle fuel systems, a more or less hard ball is pressed against a sealing surface by means of a union nut, as a result of which plastic deformation of the ball or sealing surface, which is for example formed as a tapered section, occurs at the contact circle between the sealing surface and the ball. The deformed region is referred to as a sealing band and, for its function, has to have a minimum width and a minimum pressing force in the contact area. As a result of heat cycles, settling losses and on account of the stiffness of the nut, the pressing force at the contact point may be reduced, which can lead to leakages. Since even the smallest of reverse rotation angles can mean complete loss of the prestress, such screw connections or such connections are additionally also extremely susceptible to unintentional opening. In other words, the elastic reserve of such screw connections/such connections is very small. In addition, it is often difficult to identify any leakages, especially if they are only very small.

It is therefore an object of the present invention to further develop a nut, in particular a union nut, and a line connection, such that the aforementioned disadvantages are eliminated.

This and other objects are achieved by way of a nut, by way of a line connection, and by way of the use of the nut, in accordance with the claimed invention.

According to the invention, a nut, in particular a union nut for a line connection, such as a tapered or ball connection, wherein the nut extends along a longitudinal direction, has at least one expansion region. The expansion region circumferentially has one or more cutouts (recesses) which extend transversely and/or obliquely with respect to the longitudinal direction. The expansion region is expediently configured and designed or formed in such a way that the nut can deform elastically in said region, in particular axially, that is to say along the longitudinal direction, which corresponds to a screwing direction. The expansion region advantageously terminates upstream of the end faces or end regions of the nut, as a result of which it is additionally possible to prevent radial widening or spreading apart and the resulting unintentional loosening of the nut. Particularly preferably, the at least one cutout is oriented transversely and/or obliquely with respect to the longitudinal direction, as a result of which the axial extension behavior is supported. In particular, as a result of the circumferential arrangement or extent or orientation, highly uniform extension behavior can be realized over the circumference.

The at least one cutout can be formed, for example, as a cutout which extends in a spiral-shaped manner, or as an aperture which extends in a spiral-shaped manner or an opening which extends in a spiral-shaped manner, in the lateral surface of the nut. Such a spiral or helix comprises, for example, one, two, three, four, five, six or more turns. According to one embodiment, a plurality of cutouts is also provided, which is arranged in a spiral-shaped or helical manner.

According to a preferred embodiment, a plurality of cutouts, in particular of circumferentially arranged cutouts, is provided, which are arranged circumferentially, for example in the manner of a circular ring, on the nut. In other words, a plurality of cutouts preferably circumferentially forms a ring, in particular a closed (circular) ring, with the cutouts expediently being arranged at equal spacings along the circumference. However, as an alternative, it is also possible to provide different spacings. The (circular) ring is preferably perpendicular to or inclined with respect to the longitudinal direction, as a result of which uniform deformation behavior can be realized The cutouts expediently have an elongate or narrow form, for example a slot-shaped form. By virtue of the orientation of the at least one cutout, in particular transversely and/or obliquely with respect to a screwing direction or longitudinal direction, elasticity is made possible in the axial direction, but not radially thereto, which could cause independent loosening of the screw connection. The cutout(s) are oriented substantially transversely, that is to say approximately at a 90° angle, with deviations of +/−5° likewise still being referred to as "transversely", with respect to the longitudinal direction. The expression "obliquely" encompasses angles up to a range of +/−45°. For an optimal design, rows having differently oriented cutouts or having different geometries/shapes (of the cutouts) may also be expedient. The aforementioned angle is preferably also adapted to a pitch angle of a thread of the (union) nut. According to various embodiments, the angle corresponds to the pitch angle, or the pitch angle of the thread, up to a range of +/−10°.

With regard to the shape of the cutouts, as mentioned above, they are preferably elongate slots, wherein a side ratio of such slots lies in a range from 2:1 to approximately 6:1, preferably in a range from 3:1 to 5:1. The length of a slot is thus six times greater than its width, for example, with the width being measured in the axial direction, that is to say along a screwing direction (in the case of a 90° orientation). The actual size is dependent on the size of the nut. In preferred embodiments, the slots are a few millimeters long, for example 0.5 to 3 mm. The width of the slots is expediently a result of the underlying manufacturing method. In preferred embodiments, a minimum width is approximately 0.1 mm, for example. It has been shown that the leakage test described further below can thereby be reliably performed. The width of the "bars" or webs that remain between the slots is preferably designed using calculation methods or experiments and is expediently dimensioned in such a way that no plastic deformation, or only a small amount of plastic deformation, occurs in the case of the forces which arise as a result of the screwing operation. A further preferred geometry/shape, since it is simple to produce, is an oval or round, in particular circular, geometry. Angular shapes, such as triangular or rectangular, such as square, or generally polygonal shapes, may advantageously also be used.

The at least one cutout is, or the cutouts are, preferably formed as through-openings and/or holes. As an alternative, the cutout can also be formed merely as a set-back (material) portion or the like, that is to say as an intentionally weakened material portion, whereby, depending on the design, elasticity can likewise be provided in the axial direction. Such a configuration can be expedient for example in the case of a spiral-shaped cutout.

According to one embodiment, the expansion region has a plurality of cutouts arranged in rows or circular rings. Thus, a plurality of, for example, two, three, four, five, six or more rows/circular rings is expediently arranged along the longitudinal direction or screwing direction, with each of these rows, for their part, comprising a plurality of cutouts. These may or may not be arranged at equal spacings with respect to each other.

According to a preferred embodiment, a plurality of cutouts is provided, wherein the cutouts are formed in a bone-shaped manner. The geometry of the cutout(s) is advantageously modeled on a geometry which is known from so-called tubular springs for preloading piezo stacks (for example in the field of internal combustion engine injection technology). Expediently, the cutouts/slots are therefore bone-shaped, extend transversely with respect to the screwing direction and are distributed over the circumference at equal or different spacings with respect to each other, with the order being slot, then bridge, then slot, etc. along the screwing direction, that is to say in the axial direction.

The cutouts are expediently arranged offset with respect to each other along the screwing direction/longitudinal direction, as a result of which highly uniform deformation behavior can be realized over the circumference. According to one embodiment, the nut has a shoulder region, a threaded region and an intermediate middle region, wherein the expansion region is arranged in the middle region and/or in the threaded region. By forming the expansion region in the middle region, it is advantageously possible to achieve a situation whereby the elasticity or extension is preferably hysteresis-free and therefore experiences no losses, which makes it possible to ensure a very constant sealing force in the line connection and to provide a sufficiently large elastic reserve. By virtue of an alternative or additional formation of the expansion region in the threaded region, the resulting extension in the threaded region can increase the friction in the thread, as a result of which unintentional loosening of the screw connection can advantageously be prevented. Advantageously, the screw connection can also be designed such that a maximum tightening torque cannot be exceeded, since the different pitches (deformed nut and non-deformed line end) lead to a very large increase in the frictional torques. Consequently, it is possible to establish a very robust and reproducible screw connection, which can be realized or accomplished without expensive tools.

The invention is also directed to a line connection, in particular a tapered or ball connection, comprising two line ends and at least one nut according to the invention, by means of which the line ends are connected or connectable.

Expediently, a first line end has a first sealing surface, wherein a second line end has a second sealing surface, and wherein the expansion region of the nut, in the screwed-together state of the line connection, is positioned at least between the first sealing surface and the second sealing surface. In this arrangement or configuration, the elasticity of the nut can act in an ideal manner, in other words can react automatically to the influences of heat cycles, settling losses, etc.

Expediently, the expansion region of the nut is arranged and formed in such a way that, in the event of a leakage, a medium can escape by way of the expansion region. Expediently, it is therefore possible for a test medium, for example, to escape through the slotted structure, said medium being utilized to test the leak tightness of the connection.

According to a preferred embodiment, the line connection is a pressure line or high-pressure line of a motor vehicle. In particular, it is a line such as a fuel line of a motor vehicle, in particular of a gasoline or diesel engine.

The invention is further directed to the use of a nut according to the invention in leakage tests. As already indicated, a line connection can be tested very simply and rapidly for leak tightness by way of the advantageous configuration of the expansion region, comprising the at least one cutout. For testing purposes, the nut is screwed on. The line connection can consequently be tested rapidly for leak tightness by way of any escape of a test medium or generally of a fluid, such as a liquid or a gas, which is transported in the line.

The advantages and features mentioned in conjunction with the nut also apply analogously and correspondingly to the line connection and to the use, and vice versa and between one another.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
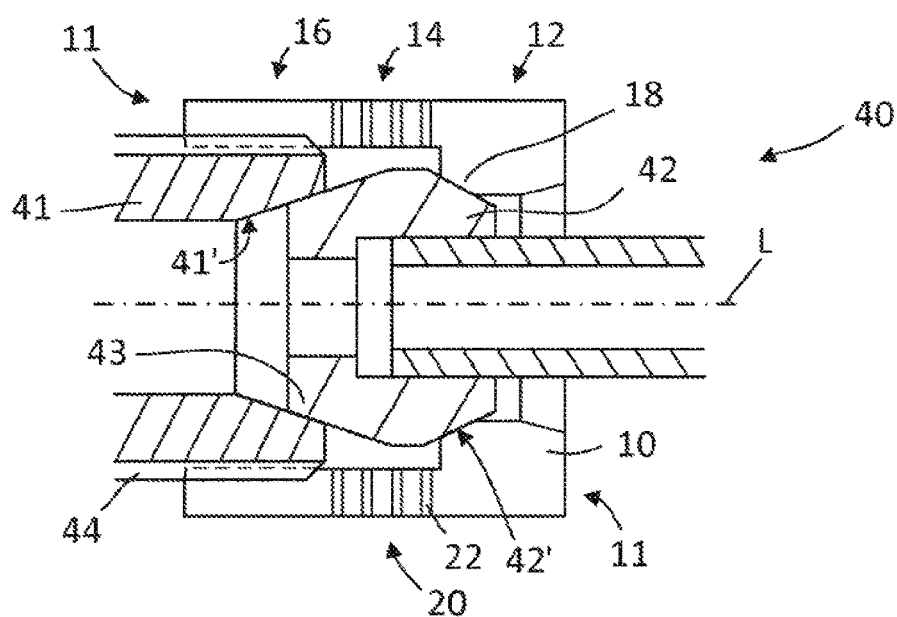
FIG. 1 is a schematic sectional view of an embodiment of a line connection.

FIG. 1 shows a schematic sectional view of a line connection 40, comprising a first line end 41 and a second line end 42. In the embodiment shown here, this is formed as a kind of tapered end piece into which a line (not further denoted) is introduced. The line connection 40 is sealed off and screwed together by way of a nut 10. In this case, the nut 10, in particular the union nut 10, has a lateral region, comprising a shoulder region 12, a middle region 14 and a threaded region 16. The lateral region terminates, at the end sides, in two end regions 11. The threaded region 16 interacts with a thread 44 of the first line end 41. The nut 10 comprises, in the shoulder region 12, a sealing region 18, which acts or presses on a second sealing surface 42' of the second line end 42. The second line end 42 in turn acts or presses with a sealing region 43 on a first sealing surface 41' of the first line end 41. It can be clearly seen that an expansion region 20 of the nut 10, comprising a plurality of cutouts 22, is arranged in a middle region 14 and therefore also between the first sealing surface 41' and the second sealing surface 42'. As a result, a screw connection with an elastic reserve can be realized, said elastic reserve making it possible for the screw connection to be more robust against unintentional loosening or against unintentional opening by way of a settling of the connection or other influences. The cutouts 22 are arranged in a plurality of rows along a longitudinal direction or screwing direction L.

Figure 2:
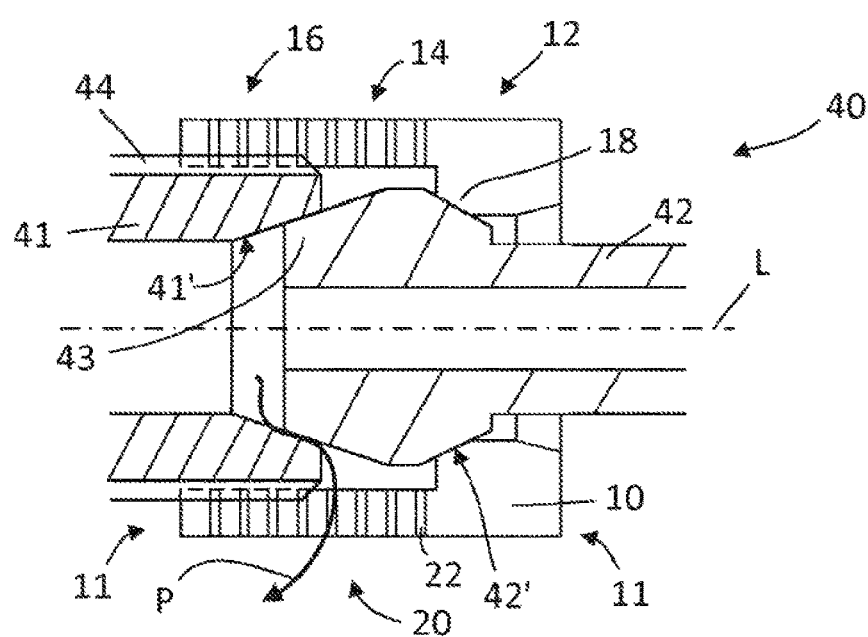
FIG. 2 is a further schematic sectional view of an embodiment of a line connection.

FIG. 2 essentially shows a line connection 40 as is already known from FIG. 1. In this case, a second line end 42 has been formed in a different manner; no differences arising in terms of the function, however. In the present case, the focus is in particular on a nut 10 which likewise has a shoulder region 12, a middle region 14 and a threaded region 16. In the embodiment outlined here, an expansion region 20, comprising a plurality of cutouts 22, is formed both in the middle region 14 and on the threaded region 16. In other words, cutouts 22 are therefore also arranged in the region of a thread 44 of a first line end 41. By virtue of the difference in pitch, which occurs during the screwing-together, between the deformed nut 10 and the non-deformed thread 44, an additional clamping action can be realized as a result of the friction which arises, which makes a line connection of this kind extremely robust against unintentional loosening. Indeed, the screw connection can even be designed such that a maximum tightening torque cannot be exceeded, since the different pitches in the threads (deformed nut and non-deformed thread on the line end) lead to a very large increase in the frictional torque. The reference designation P delineates an arrow which indicates a direction or a path that a test medium, or generally a medium which is, or is intended to be, transported within the line connection, can assume if a sealing action, in this case, for example, between a sealing region 43 of the second line end 42 and a first sealing surface 41' of the first line end 41, is not provided. In order to avoid repetitions, reference is otherwise made to FIG. 1.

Figure 3:
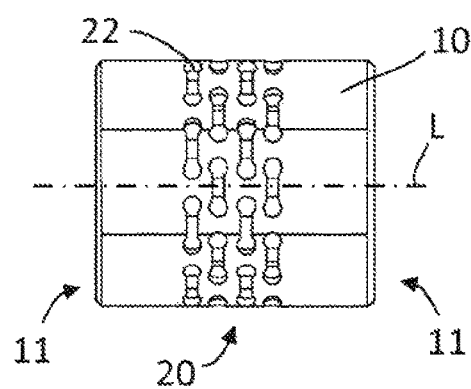
FIG. 3 is an exterior view of an embodiment of a nut.

FIG. 3 shows a nut 10 comprising an expansion region 20 which has four rows of cutouts 22, each of the cutouts 22 being formed in a bone-shaped manner. The cutouts 22 are also advantageously arranged offset with respect to each other along a longitudinal direction or screwing direction L. Along the longitudinal direction L, a cutout 22 or a slot is followed by a bridge or a web, and vice versa, etc. Such a geometry is derived from the design of tubular springs, which are used, for example, for preloading piezo stacks in the field of internal combustion engine injection technology. In particular, this geometry is distinguished by the fact that highly uniform elasticity or highly uniform extension behavior can be provided over the circumference.

LIST OF REFERENCE DESIGNATIONS

10 Nut
11 End region
12 Shoulder region
14 Middle region
16 Threaded region
18 Sealing region
20 Expansion region
22 Cutout
40 Line connection
41 First line end
41' First sealing surface
42 Second line end
42' Second sealing surface
43 Sealing region
44 Thread
L Longitudinal direction, screwing direction
P Path The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A line connection, comprising:
first and second line ends;
a nut comprising at least one expansion region, which nut extends along a longitudinal direction, and wherein the expansion region circumferentially has one or more cutouts extending transversely and/or obliquely with respect to the longitudinal direction, wherein
a respective length of the one or more cutouts is greater than a respective width of the one or more cutouts and wherein the length extends transversely and/or obliquely with respect to the longitudinal direction,
the nut has a shoulder region, a threaded region and a middle region disposed between the shoulder region and the threaded region, wherein the shoulder region and the middle region are unthreaded,
the expansion region is arranged in the unthreaded middle region and not in the shoulder region and threaded region, or the expansion region is arranged in the unthreaded middle region and in the threaded region but not in the shoulder region,
the first and second line ends are connected via the nut,
the first line end has a first sealing surface,
the second line end has a second sealing surface,
the expansion region of the nut, in a screwed-together state, is positioned at least between the first sealing surface and the second sealing surface.

2. The line connection according to claim 1, wherein the expansion region is arranged and formed such that, in an event of leakage, a medium can escape by way of the expansion region.

3. The line connection according to claim 1, wherein the line connection is a high-pressure line of a motor vehicle.

4. A use of a nut in a leakage test of a line connection, wherein the line connection comprises:
first and second line ends;
the nut comprising at least one expansion region, which nut extends along a longitudinal direction, and wherein the expansion region circumferentially has one or more cutouts extending transversely and/or obliquely with respect to the longitudinal direction, wherein
a respective length of the one or more cutouts is greater than a respective width of the one or more cutouts and wherein the length extends transversely and/or obliquely with respect to the longitudinal direction,
the nut has a shoulder region, a threaded region and a middle region disposed between the shoulder region and the threaded region, wherein the shoulder region and the middle region are unthreaded,
the expansion region is arranged in the unthreaded middle region and not in the shoulder region and threaded region, or the expansion region is arranged in the unthreaded middle region and in the threaded region but not in the shoulder region,
the first and second line ends are connected via the nut,
the first line end has a first sealing surface,
the second line end has a second sealing surface,
the expansion region of the nut, in a screwed-together state, is positioned at least between the first sealing surface and the second sealing surface.

* * * * *